No. 662,554. Patented Nov. 27, 1900.
H. G. ADEN.
TRACE SUPPORT.
(Application filed Apr. 13, 1900.)

(No Model.)

WITNESSES:

INVENTOR
Henry G. Aden
BY
Attorney

UNITED STATES PATENT OFFICE.

HENRY G. ADEN, OF POMEROY, IOWA.

TRACE-SUPPORT.

SPECIFICATION forming part of Letters Patent No. 662,554, dated November 27, 1900.

Application filed April 13, 1900. Serial No. 12,738. (No model.)

*To all whom it may concern:*

Be it known that I, HENRY G. ADEN, a citizen of the United States, residing at Pomeroy, in the county of Calhoun and State of Iowa, have invented certain new and useful Improvements in Trace-Carriers; and I do hereby declare the following to be a full, clear, and exact description of the invention, such as will enable others skilled in the art to which it appertains to make and use the same.

This invention belongs to that class of harness attachments specially designed for supporting the traces when disconnected from the singletree to prevent their dangling and liability of getting beneath the animal's feet.

An essential feature of the invention is the provision of a device of the character and for the purpose aforesaid which can be applied to the several straps—such as the back, crupper, and hip straps—of a harness without requiring the loosening of a single one of the said straps or a part thereof and which will prevent entanglement of the lines or any part of the harness or the horse's tail with the vertical T projections to which the traces are attached when the animal is unhitched.

For a full description of the invention and the merits thereof, and also to acquire a knowledge of the details of construction of the means for effecting the result, reference is to be had to the following description and the drawings hereto attached.

While the essential and characteristic features of the invention are necessarily susceptible of modification, still the preferred embodiment of the invention is illustrated in the accompanying drawings, in which—

Figure 1:
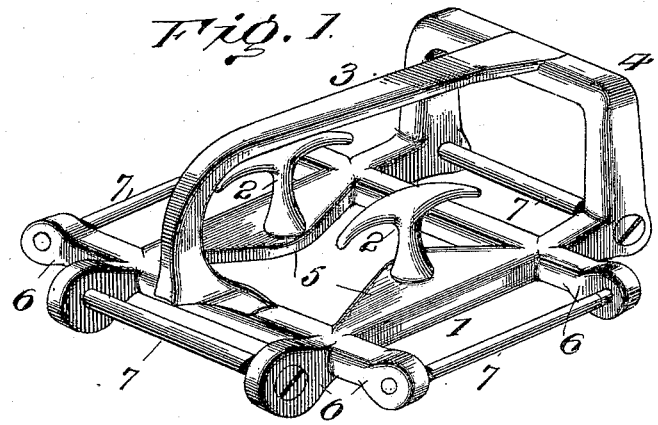
Figure 2:
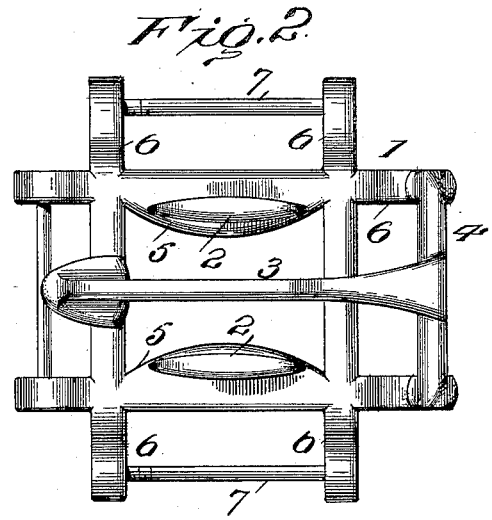
Figure 3:
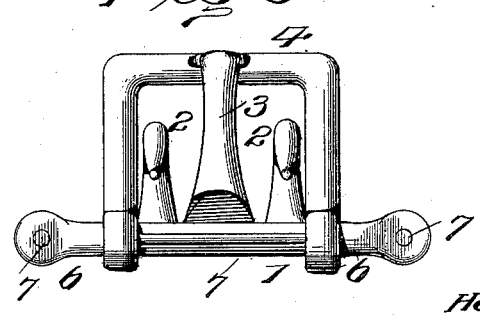

Figure 1 is a perspective view of a trace-carrier specially designed for attaining the objects of this invention. Fig. 2 is a top plan view. Fig. 3 is an end view.

Corresponding and like parts are referred to in the following description and indicated in both views of the drawings by the same reference characters.

The trace-carrier in its general construction comprises a base-frame 1, having offstanding loops in the plane thereof and upon its four sides for attachment thereto of the back, crupper, and hip straps in the manner well understood, vertical T projections 2, extending in parallel relation and rising from lateral extensions of oppositely-disposed bars of the base-frame, a longitudinal guard 3, disposed medially of the T projections 2, and an end transverse guard 4. The base-frame 1 is of rectangular formation, and the side bars have inner extensions 5, from which rise vertically the T projections 2. Pairs of lugs 6 project outwardly from the four sides of the base-frame in line with the respective bars of which they form, in effect, prolongations, and these lugs are transversely apertured and are in the same plane with the base-frame. Pins or rods 7 in the transverse openings of corresponding lugs form, with the latter and the adjacent frame-bar, loops to receive the respective straps. The pins or rods are detachably fitted to the respective pairs of lugs and are headed at one end and threaded at the opposite end to make screw-thread connection with a lug of the respective pairs of lugs, the headed ends of the pins or rods fitting loosely in the opposite lugs. This construction admits of the device being fitted to a set of harness without requiring the loosening of any of the straps to be attached thereto and which is of material advantage in the event of the attaching ends of the straps being permanently looped or difficult of loosening.

The transverse guard 4 is in the form of an arch, and its side portions are attached to the outer terminals of a pair of end lugs. The purpose of the guard 4 is to prevent engagement of the lines or any part of the harness with the projections 2. The longitudinal guard 3 is located about centrally of the device and medially of the T projections and is secured at one end centrally to the horizontal portion of the transverse guard 4 and is attached at its other end to the frame-bar remote from the guard 4 and parallel therewith. The longitudinal guard prevents engagement of any part of the harness or the horse's tail with the projections 2 and supplements the action of the transverse guard 4 in the attainment of this result. The horizontal portion of the guard 3 is located a sufficient distance above the cross-heads of the projections 2 to admit of the terminals of the traces clearing the same when attaching the traces to or disconnecting them from the T projections.

The T projections 2 are disposed parallel with each other and with a plane passing through the longitudinal guard 3 and are straight and project vertically from the base-frame. This construction admits of the traces being readily applied to the projections and easily disconnected therefrom.

The base-frame, the transverse and longitudinal guards, and the several pairs of off-standing lugs constitute parts of an integral casting, the side loops having their outer members or parts removable to admit of the several straps being readily and conveniently attached thereto or disconnected therefrom, according as the trace-carrier is applied to a harness or removed therefrom.

Having thus described the invention, what is claimed as new is—

1. A trace-carrier comprising a base-frame of rectangular formation, pairs of lugs projecting from the four sides of the base-frame, pins or screws detachably fitted to the outer ends of the respective pairs of lugs, T projections springing from oppositely-disposed frame-bars, an end transverse guard, and a longitudinal guard disposed medially of the T projections, substantially as set forth.

2. The herein-described trace-carrier comprising a base-frame of rectangular formation and having pairs of transversely-apertured lugs at its four sides and in the plane of the frame and forming prolongations of the respective frame-bars, an arch springing from the outer terminals of a pair of said lugs and constituting a transverse guard, a longitudinal guard having one end attached centrally to the horizontal portion of the transverse guard and its opposite end attached to the frame-bar remote from the transverse guard and parallel therewith, T projections disposed in parallel relation and upon opposite sides of a plane passing through the longitudinal guard and springing from inner extensions of the side bars of the frame, and pins or screws detachably fitted to the respective pairs of lugs and forming therewith and with the adjacent frame-bars loops for attachment with the device of the several straps of a harness, substantially as specified.

In testimony whereof I affix my signature in presence of two witnesses.

HENRY G. ADEN.

Witnesses:
O. F. HITTENMARK,
J. E. DOVONEY.